(12) United States Patent
Jewell et al.

(10) Patent No.: US 7,802,930 B2
(45) Date of Patent: Sep. 28, 2010

(54) LOW-NOISE OPTICAL TRANSMITTER

(75) Inventors: Jack L. Jewell, Boulder, CO (US); Luke A. Graham, Louisville, CO (US)

(73) Assignee: JDS Uniphase Corporation, Milpitas, CA (US)

( * ) Notice: Subject to any disclaimer, the term of this patent is extended or adjusted under 35 U.S.C. 154(b) by 0 days.

(21) Appl. No.: 12/042,062

(22) Filed: Mar. 4, 2008

(65) Prior Publication Data

US 2009/0226133 A1    Sep. 10, 2009

(51) Int. Cl.
G02B 6/36 (2006.01)
G02B 6/32 (2006.01)

(52) U.S. Cl. .......................................... 385/93; 385/33
(58) Field of Classification Search .................... 385/33, 385/93; 359/721
See application file for complete search history.

(56) References Cited

U.S. PATENT DOCUMENTS

| 6,496,621 | B1 | 12/2002 | Kathman et al. | |
| 6,530,697 | B1 | 3/2003 | Johnson et al. | |
| 6,600,845 | B1 | 7/2003 | Feldman et al. | |
| 2002/0159489 | A1* | 10/2002 | Wolak et al. | 372/36 |
| 2004/0091218 | A1* | 5/2004 | van Haasteren | 385/93 |

\* cited by examiner

*Primary Examiner*—Uyen-Chau N Le
*Assistant Examiner*—Kajli Prince
(74) *Attorney, Agent, or Firm*—Matthew A. Pequignot; Pequignot + Myers LLC

(57) ABSTRACT

A device comprising: an optical subassembly has a lens rear surface including one or more facets for scattering at least some of the light transmitted through the lens rear surface.

6 Claims, 10 Drawing Sheets

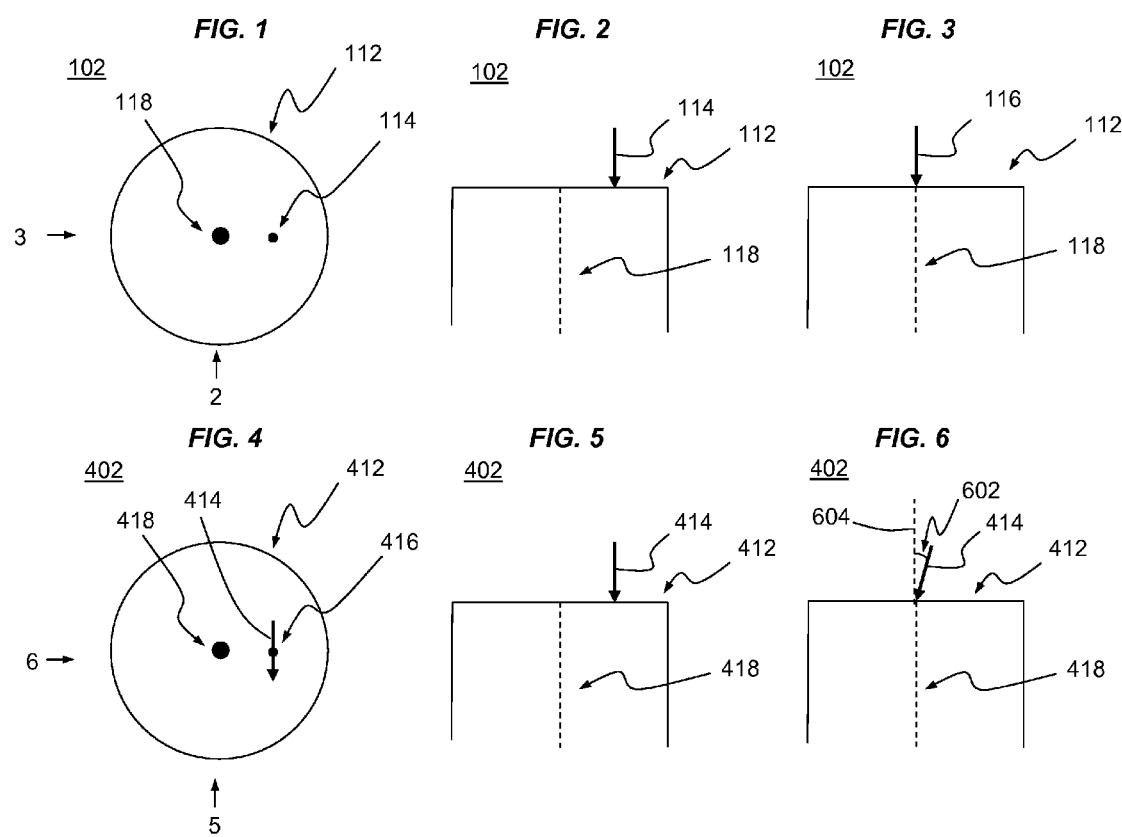

LOW-NOISE OPTICAL TRANSMITTER

BACKGROUND

1. Field of the Invention

The present invention relates generally to optical transmitters.

2. Related Art

One of the problems in fiber communications is that optical feedback, typically from the fiber to the laser, affects the laser operation and gives rise to jitter in the timing of the rising and falling edges of the signal. The effects of the feedback are most severe with single-mode lasers, e.g. 1310 nm VCSELs or DFB lasers, but it is also significant with multi-mode lasers, e.g. 850 nm VCSELs or Fabry-Perot (FP) lasers. Therefore, there exists a need for a way to reduce feedback for single-mode lasers and multi-mode lasers.

SUMMARY

According to a broad aspect of the present invention, there is provided an optical subassembly; a lens that has an optical axis and that is located on a proximal end of the optical sub-assembly for focusing a light beam travelling through the optical subassembly; a fiber receptacle that has a fiber axis and that is located on a distal end of the optical subassembly for receiving an optical fiber; and a lens rear surface at the proximal end of a recess that extends into an interior end surface of the fiber receptacle, wherein the lens rear surface includes one or more facets that are angled with respect to the fiber axis of the optical subassembly.

BRIEF DESCRIPTION OF THE DRAWINGS

The invention will be described in conjunction with the accompanying drawings, in which:

FIG. 1 is a schematic view of an offset launch of light into a single-mode fiber looking down the fiber core;

FIG. 2 is a schematic side view of the offset launch of FIG. 1 taken in the direction of arrow 2 of FIG. 1;

FIG. 3 is a schematic side view of the offset launch of FIG. 1 taken in the direction of arrow 3 of FIG. 1;

FIG. 4 is a schematic view of an offset launch of light into a single-mode fiber looking down the fiber core;

FIG. 5 is a schematic side view of the offset launch of FIG. 1 taken in the direction of arrow 5 of FIG. 4;

FIG. 6 is a schematic side view of the offset launch of FIG. 1 taken in the direction of arrow 6 of FIG. 4;

DETAILED DESCRIPTION

Figure 7:
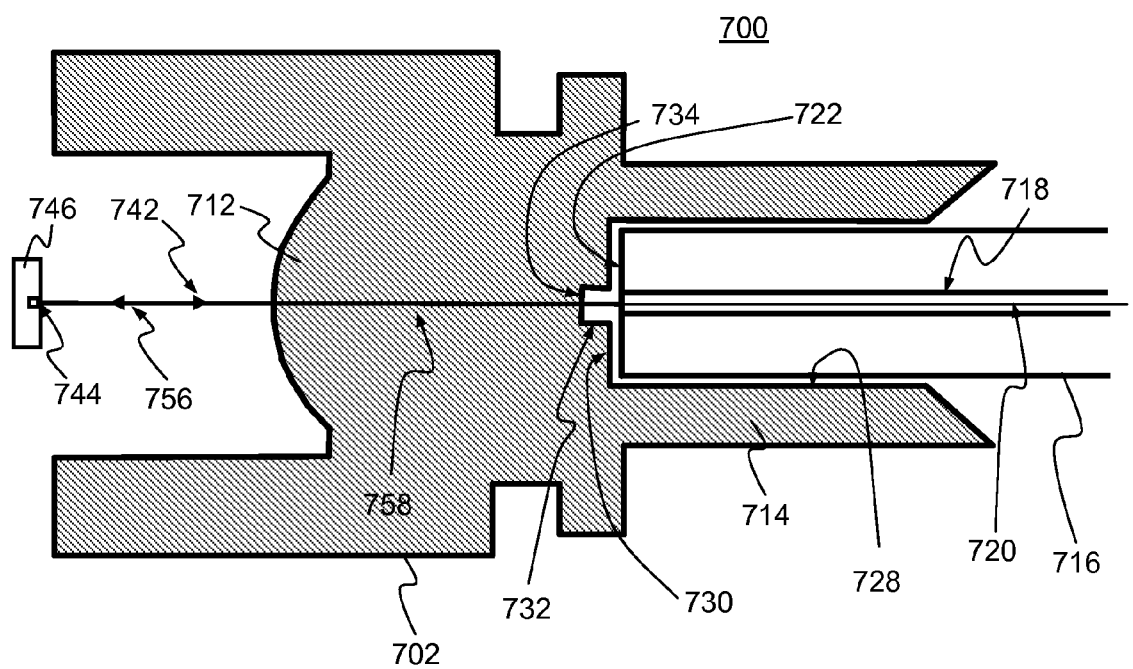
FIG. 7 is a schematic cross-sectional view of an optical system including an aligned OSA.

It is advantageous to define several terms before describing the invention. It should be appreciated that the following definitions are used throughout this application.

Definitions

Where the definition of terms departs from the commonly used meaning of the term, applicant intends to utilize the definitions provided below, unless specifically indicated.

For the purposes of the present invention, the term "unibody" refers to a device that is constructed of one primary element, as opposed to two or more elements assembled, or removably connected.

For the purposes of the present invention, the term "constructed integrally" refers to a device that has been constructed to include multiple parts having various functions, where the multiple pieces may not be separated from the remainder of the device without damaging the device.

For the purposes of the present invention, the term "diffractive element" refers to an element that decomposes a light beam into sub-beams to redirect the light into directions corresponding to constructive interference between the sub-beams, wherein each of the sub-beams has a phase difference of an integral number of wavelengths not equal to zero. A diffractive element typically comprises a large number of sub-elements that each has a width on the order of an optical wavelength of the light diffracted by the element. A diffractive element may be composed of multiple diffractive elements. Examples of diffractive elements are described in U.S. Pat. Nos. 6,530,697; 6,496,621; and 6,600,845, the entire contents and disclosures of which are hereby incorporated by reference.

For the purposes of the present invention, the term "facet" refers to an angled surface. A facet may be flat or curved. A curved facet may be either convex or concave.

For the purposes of the present invention, the term "refractive element" refers to an element that does not decompose a light beam, but after the light beam passes through the refractive element all of the portions the light beam have substantially zero phase difference. An element may act as a refractive element due to: the shape of the refractive, the angle at which a light strikes the refractive element, variation in the refractive index of the refractive element, etc. A refractive element may be composed of multiple refractive elements.

For the purposes of the present invention, the term "axial alignment" refers to two or more items that all lie along the axis of at least one of the items to permit light to pass through each of the items. Two items that are in axial alignment are "coaxial."

For the purposes of the present invention, the term "laser end" or "proximal end" refers to end of an optical subassembly where a laser is located.

For the purposes of the present invention, the term "fiber end" or "distal end" refers to the end of an optical subassembly where a fiber is inserted into the sub-assembly or where a fiber may be inserted into the sub-assembly.

For the purposes of the present invention, the term "radial" refers to a direction either toward or away from the center an optical aperture.

For the purposes of the present invention, the term "azimuthal" refers to a direction oriented at a right angle to a radius from the center of an optical aperture.

For the purpose of the present invention, the term "chordial" refers to a direction along any chord of an optical aperture i.e. a direction that is non-radial. A purely azimuthal direction is a chordial direction that has no radial component.

Figure 11A:
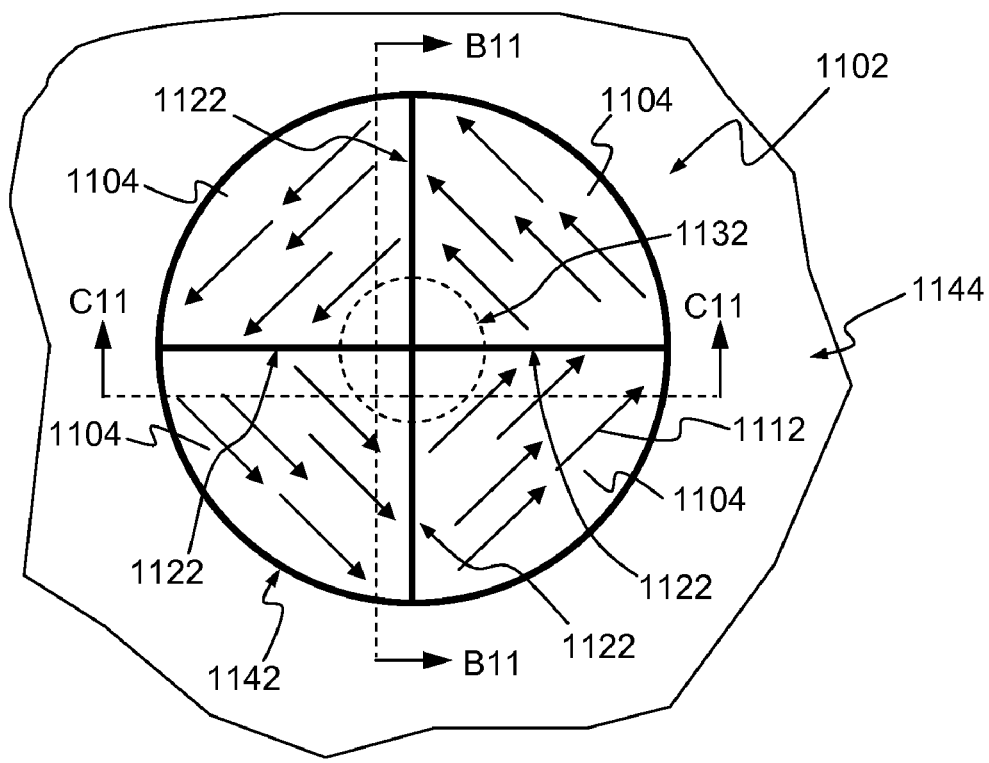
FIG. 11A is a schematic top view of an azimuthal faceted lens rear surface of the present invention having four facets that slant in the same azimuthal direction.
Figure 13A:
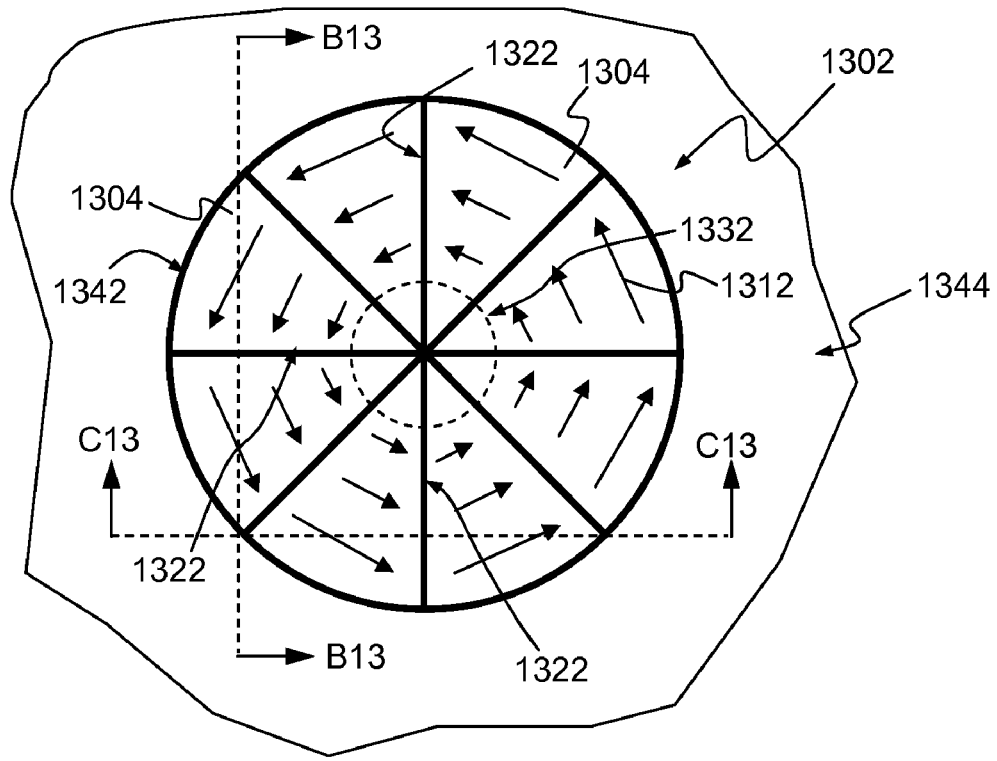
FIG. 13A is a schematic top view of an azimuthal faceted lens rear surface of the present invention having eight facets that slant in the same azimuthal direction.
Figure 15A:
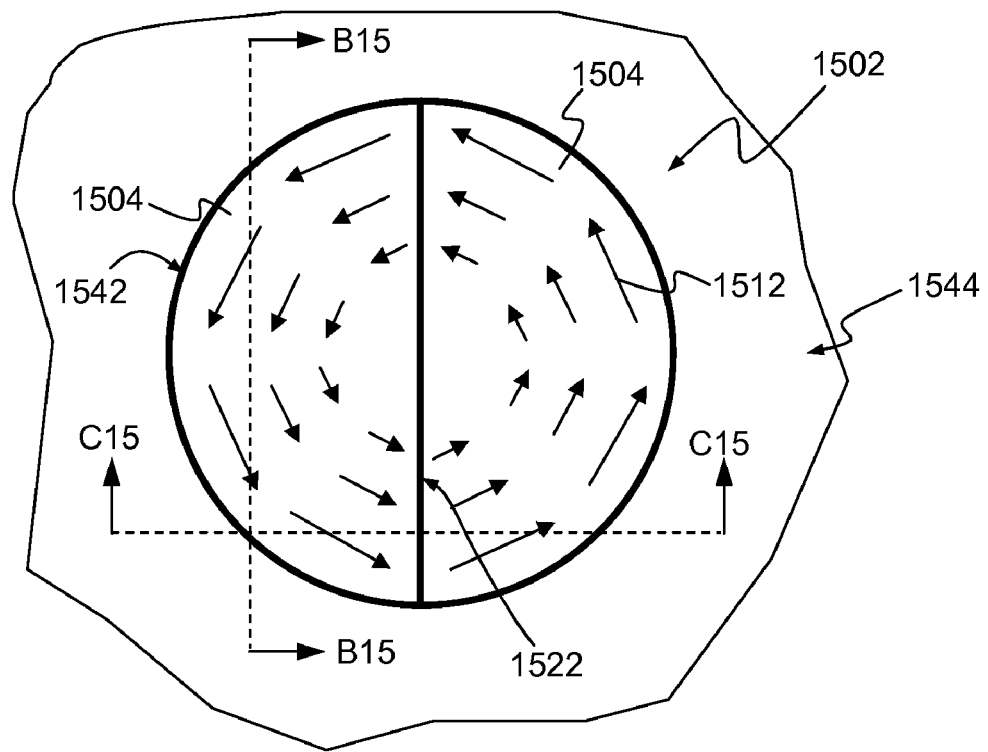
FIG. 15A is a schematic top view of an azimuthal faceted lens rear surface of the present invention having two facets where both facets slant in the same azimuthal direction.

For the purposes of the present invention, the term "escherian staircase" refers to a radial surface having an appearance that is reminiscent of the staircase in M. C. Escher's famous drawing "Ascending and Descending." FIGS. 11A, 13A and 15A show examples escherian staircase surfaces.

Figure 12A:
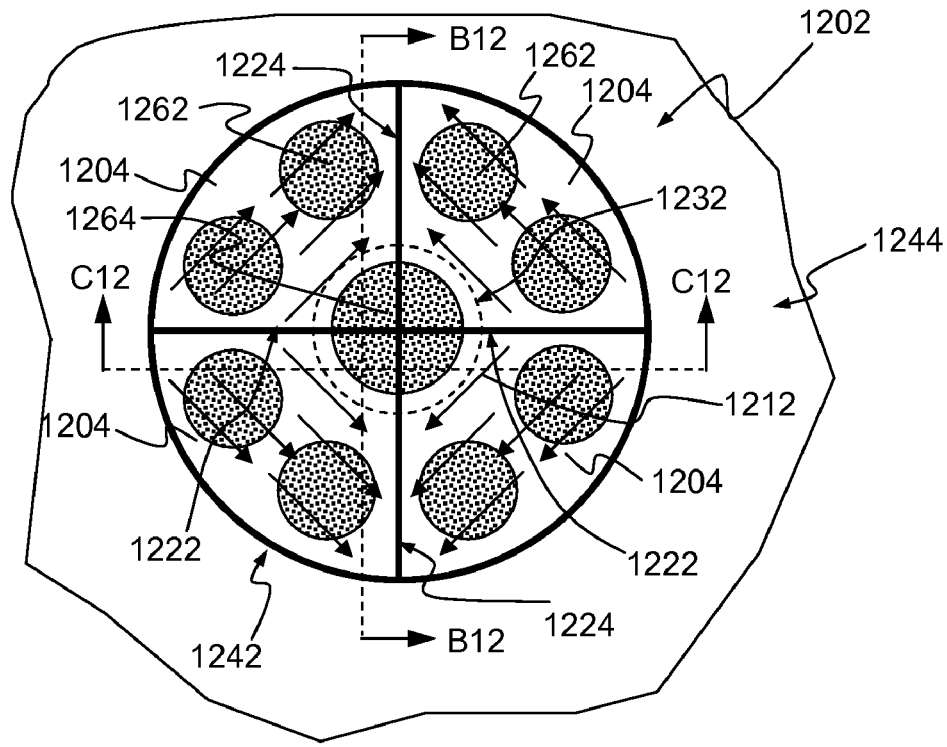
FIG. 12A is a schematic top view of an azimuthal faceted lens rear surface of the present invention having four facets where adjacent facets slant in opposite azimuthal directions.
Figure 14A:
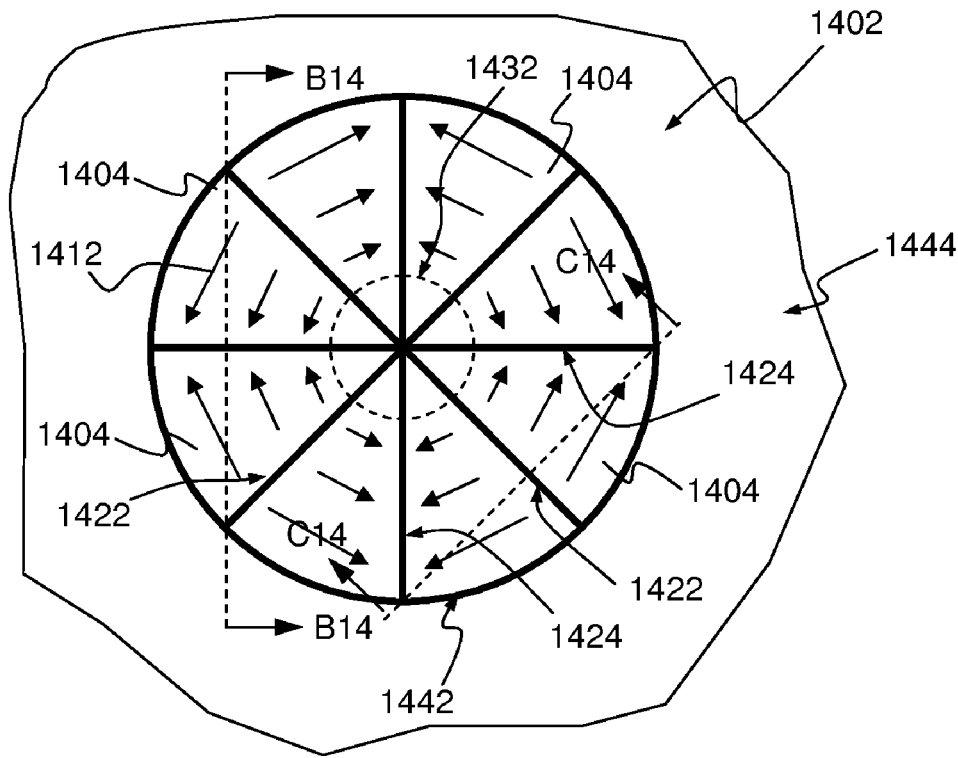
FIG. 14A is a schematic top view of an azimuthal faceted lens rear surface of the present invention having eight facets where adjacent facets slant in opposite azimuthal direction.

For the purposes of the present invention, the term "radial accordion" refers to a radial surface having adjacent facets that slant in opposite directions." FIGS. 12A and 14A show examples radial accordion surfaces.

For the purposes of the present invention, the term "optical scattering" refers to the deflection of light from the path it would follow if the refractive index were uniform or gradually graded. Scattering is caused primarily by microscopic or submicroscopic fluctuations in the refractive index or surface.

Description

It has been found experimentally, with parallel optical modules, that misalignment can reduce the effects of feedback with multi-mode 850 nm VCSEL arrays. The effect of misalignment is that the misaligned beam is incident on the fiber at an angle. In fact, intentionally tilting the VCSEL array produces a similar reduction of feedback effects. For an idealized optical system, the reflected light beam should propagate directly back to the VCSEL aperture. Non-ideal systems, e.g. those using a ball lens or other non-ideal lens, may have the beam distorted on the return, which may reduce feedback effects, but only slightly. For a multi-mode VCSEL in a misaligned system or one with the tilted VCSEL, the effects of feedback may be reduced since the reflected light beam incident on the VCSEL will be at a different angle from the emitted light beam.

An objective of the present invention is to produce an optical subassembly (OSA) in which the effects of optical feedback are reduced. In a manufacturing environment, it is undesirable to have misalignment or tilting of the laser source. It is therefore a further objective of present invention to provide an optical subassembly in which the laser, e.g. VCSEL, does not need to be tilted, and in which misalignment is minimized. It is yet another objective of the present invention to produce and OSA in which the effective modal bandwidth of a multi-mode fiber is improved.

Feedback effects may be decreased and the effective modal bandwidth (MBW) may be increased by an optimized launch condition. In Gigabit Ethernet, even the 500 MHz-km MBW is achieved by an "offset launch" in which light from a single-mode fiber is coupled into a 62.5 µm diameter MMF fiber offset by ~23 µm from the center. Such an offset launch 102 is shown in FIGS. 1, 2, and 3 showing a fiber core 112 into which is launched a light beam 114 that is offset from optical axis 118 of fiber core 112. FIGS. 1, 2 and 3 show three views of launch 102: looking down fiber core 102 (FIG. 1), looking at the side of fiber core 112 (FIG. 2, the direction of arrow 2 of FIG. 1), and looking at the side of fiber core 112 from an angle 90° rotated from the view of FIG. 2 (FIG. 3, the direction of arrow 3 of FIG. 1). This launches the light away from the innermost and outermost modes, but after propagating some distance in the fiber, the light may redistribute and couple into some of the undesired modes, particularly the innermost modes.

The effective MBW may be further improved by introducing an azimuthal angle to the launch into the fiber, for example an angle between 1 and 10 degrees. Such an angled offset launch 402 is shown in FIGS. 4, 5, and 6 showing a fiber core 412 into which is launched a light beam 414 that enters fiber core 412 at a point 416 offset from optical axis 418 of fiber core 412. As shown in FIG. 6, light beam 414 is launched into fiber core 412 at an angle 602 to a vertical line 604 extending from optical axis 418. Together vertical line 604 and optical axis 418 FIGS. 4, 5 and 6 show three views of launch 402: looking down fiber core 412 (FIG. 4), looking at the side of fiber core 412 (FIG. 5, the direction of arrow 5 of FIG. 1), and looking at the side of fiber core 414 from an angle 90° rotated from the view of FIG. 5 (FIG. 6, the direction of arrow 6 of FIG. 1).

The azimuthal angular component to the launch shown in FIGS. 4, 5 and 6 minimizes the coupling into the innermost modes, since the light tends to propagate in a spiral pattern down the fiber. The "offset azimuthal launch" may be accomplished by 1) introducing the azimuthal angle into the optical subassembly; 2) aligning to a single-mode fiber; 3) laterally translating the laser by a distance which produces the desired lateral offset; and 4) setting the components in place. The angular incidence of the beam onto the fiber will reduce the effects of the reflected light beam on the VCSEL, especially if it is a multi-mode VCSEL. Tilting the VCSEL will cause the beam incident on the fiber to be at an angle. If the displacement is in a direction orthogonal to the plane defined by the beam and the optical axis of the fiber, then the angle will be in an azimuthal orientation.

FIG. 7 shows an example of an optical system 700 including an aligned OSA 702 including a lens 712 at a proximal end of OSA 702 and a fiber receptacle 714 at a distal end of OSA 702 for receiving an optical fiber 716 having a fiber core 718, a fiber axis 720, and a flat fiber distal end 722. Fiber receptacle 714 has a cylindrical interior surface 728 having an interior end surface 730 into which extends a cylindrical recess 732 having at a proximal end thereof a straight lens rear surface 734, which may be optically flat, concave, convex, faceted, or any other shape. An emitted light beam, indicated by right-pointing arrowhead 742, is emitted from an aperture 744 of a flat mounted VCSEL 746, travels through lens 712 and becomes incident on fiber distal end 722 at fiber axis 720. A portion of the emitted light beam is reflected by fiber distal end 722 as a reflected light beam, indicated by left-pointing arrowhead 756, and is returned straight back, along optical axis 758, into an aperture 744 of VCSEL 746. Optical fiber 714 includes a flat distal end 722 that reflects the emitted light beam. Lens rear surface 734 is considered "straight" because lens rear surface 734 is perpendicular to fiber axis 720 and optical axis 758 that extends along fiber axis 720.

In FIG. 7, the reflected light beam may enter the VCSEL aperture and interfere with the light being generated by the VCSEL, with constructive and destructive interference varying rapidly, thereby causing intensity fluctuations in the emitted light beam, which gives rise to noise and jitter in the signal.

Figure 8:
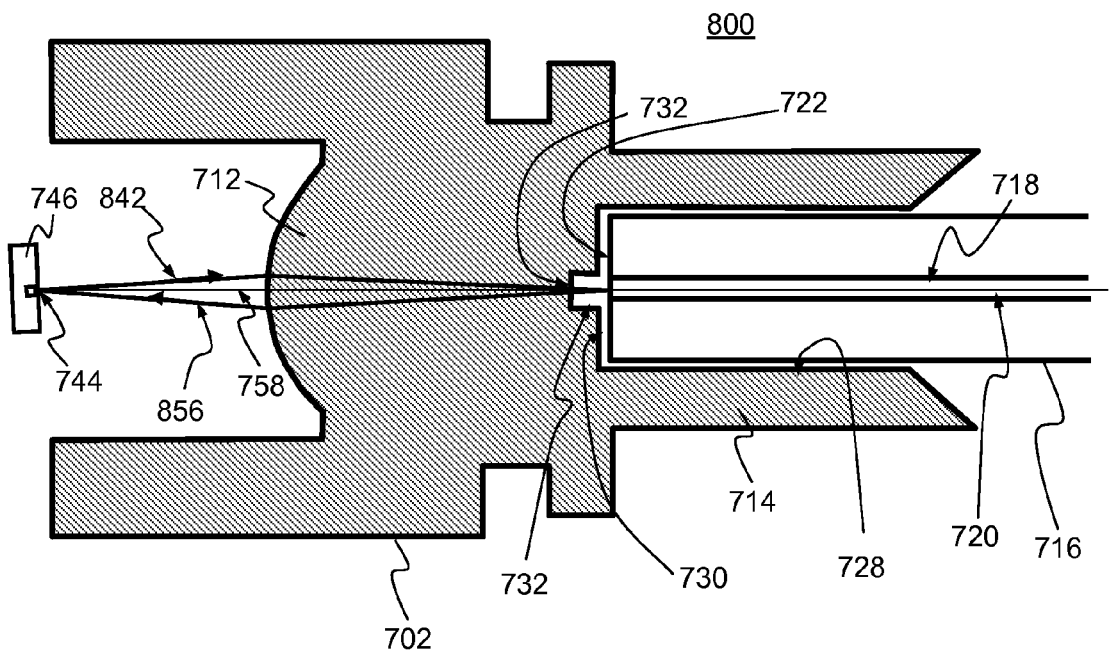
FIG. 8 is a schematic cross-sectional view of the optical system with a VCSEL tilted to form an angled emitted light beam and angled reflected light beam.
Figure 9:
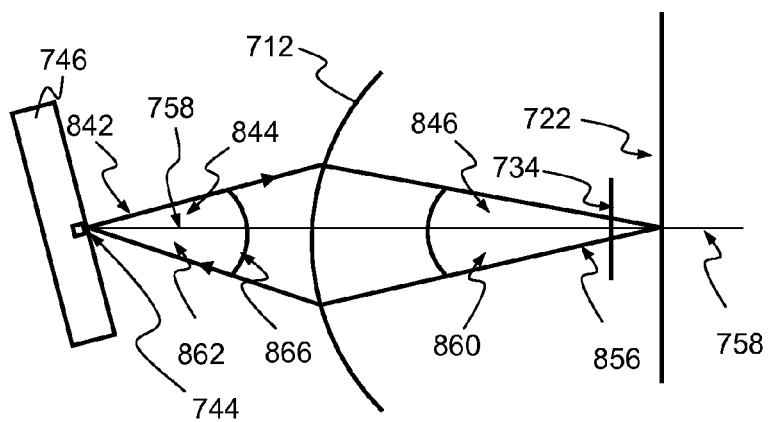
FIG. 9 shows the path of the emitted light beam and reflected light beam of the optical system of FIG. 8, with proportions of the features of the system altered to better show the angular paths of the emitted and reflected light beams.

FIGS. 8 and 9 show the effect of tilting the VCSEL 746 of FIG. 7. In optical system 800, an emitted light beam 842 propagates at an angle 844 with respect to optical axis 758. Emitted light beam 842 is refracted by lens 712 to make an angle 846 with optical axis 758 and becomes incident on fiber distal end 722 at fiber axis 720. A portion of emitted light beam 842 is reflected by fiber distal end 722 to form reflected light beam 856. Reflected light beam 856 is reflected at an angle 860 with respect to optical axis 758. Reflected light beam 856 is refracted by lens 712 so that reflected light beam 856 enters the aperture (not shown) of VCSEL 746 at an angle 862 with respect to optical axis 758. Reflected light beam 856 is incident on VCSEL aperture 744 at a relative angle 866 (the sum of angles 844 and 862) that is two times angle 844, the tilt angle of VCSEL 746.

In a system such as shown in FIGS. 8 and 9, the reflected light beam may be degraded relative to the emitted light beam due to the double pass through the lens system. The angle between the emitted and reflected beams produces variation in the constructive and destructive interferences, thereby decreasing the overall intensity fluctuations. A lens system having some aberrations is also likely to result in less feedback than a perfect lens. Also, as mentioned earlier, tilting of components is undesirable in a manufacturing environment. Ways of producing a variety of improved optical systems will now described.

Figure 10A:
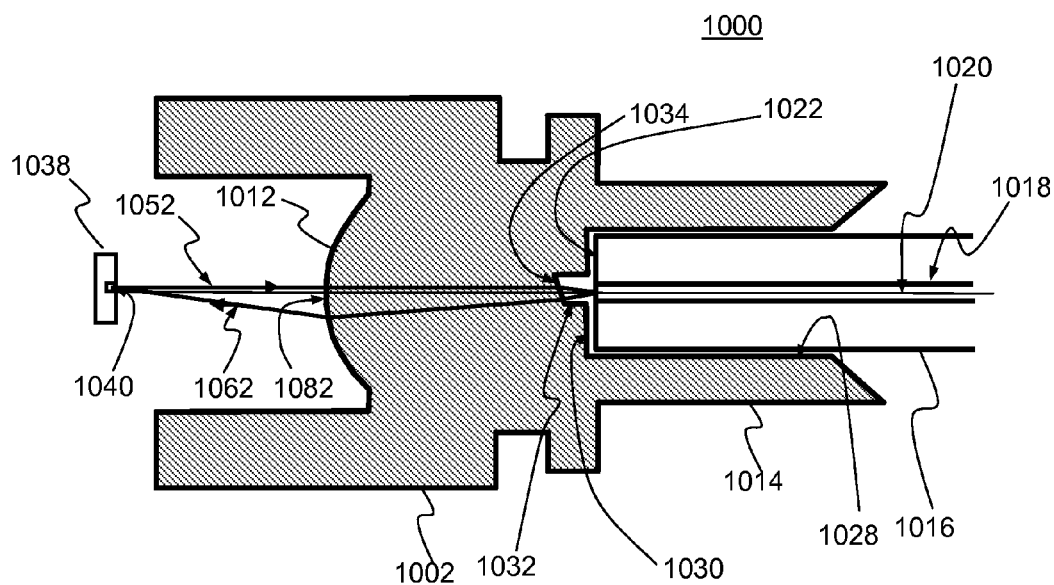
FIG. 10A is a schematic cross-sectional view of an optical system according to one embodiment of the present invention with an off-centered VCSEL and an OSA including an angled flat rear surface.
Figure 10B:
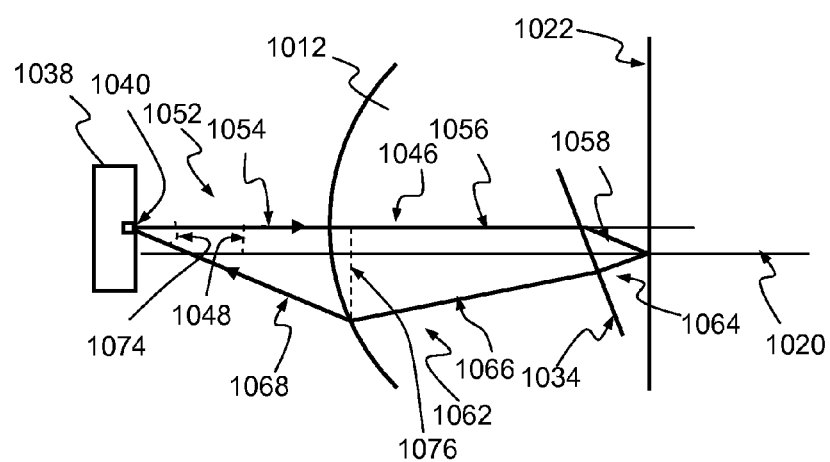
FIG. 10B shows the path of the emitted light beam and reflected light beam of the optical system of FIG. 10A, with proportions of the features of the system altered to better show the angular paths of the emitted and reflected light beams.

FIGS. 10A and 10B show an optical system 1000 including an OSA 1002 including a lens 1012 at proximal end of OSA 1002 and a fiber receptacle 1014 at a distal end of OSA 1002 for receiving an optical fiber 1016 having a fiber core 1018, a fiber axis 1020, and a flat fiber distal end 1022. Fiber receptacle 1014 has a cylindrical interior surface 1028 having an interior end surface 1030 into which extends a cylindrical recess 1032 having at a proximal end thereof an angled lens rear surface 1034, which may be optically flat, concave, convex, faceted, or any other shape. As shown in FIG. 10A as a single surface, angled lens rear surface 1034 may be considered a single facet. VCSEL 1038 is mounted flat and has an aperture 1040 that is decentered with respect to fiber axis 1020 by a distance 1048. As illustrated in FIGS. 10A and 10B, lens 1012 has an optical axis 1046, which is also decentered with respect to fiber axis 1020 by a distance 1048, although the displacement could be by any distance. An emitted light beam 1052 from aperture 1040 of VCSEL 1038 travels in a horizontal path 1054 through lens 1012 and along a path 1056, which is preferably approximately horizontal. Then, emitted light beam 1052 is refracted by lens rear surface 1034 along a downward path 1058 that causes emitted light beam 1052 to become incident on flat fiber distal end 1022, approximately at fiber axis 1020. Due to the downward path 1058 of light beam 1052, it may be preferably for light beam 1052 to become incident on flat fiber distal end 1022 slightly above fiber axis 1020. A portion of emitted light beam 1052 is then reflected as reflected light beam 1062 along downward path 1064. Reflected light beam 1062 is refracted by lens rear surface 1034 along a shallower downward path 1066. Reflected light beam 1062 is then refracted along an upward path 1068 by lens 1012 and becomes incident on the aperture 1040 of VCSEL 1038 at an angle 1074. A larger angle 1074 will result in reduced interference of reflected beam 1062 with VCSEL 1038. Reflected light beam 1062 is displaced by a distance 1076 from optical axis 1046 at the point where reflected light beam 1062 is refracted by lens 1012.

In one embodiment of the present invention, the VCSEL and lens of FIGS. 10A and 10B may be displaced to the right or left, i.e. in a direction perpendicular to plane shown in FIGS. 10A and 10B, with respect to each other thereby producing an offset tilted launch such as depicted in FIGS. 4-6.

The relative displacements of the emitted and reflected light beams from the lens center/optical axis in system 1000 maximizes the emitted light beam quality on the fiber and minimizes the reflected light beam quality incident on the VCSEL. In particular, a lens with modest aberrations may produce an adequately-focused emitted light beam onto a fiber, while creating a highly-aberrated reflected light beam back to the VCSEL, which therefore minimizes the feedback noise.

Figure 11B:
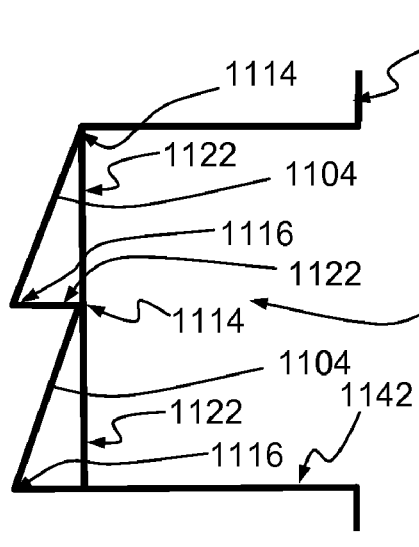
FIG. 11B is a cross-sectional view of the faceted lens rear surface of FIG. 11A taken along line B11-B11.
Figure 11C:
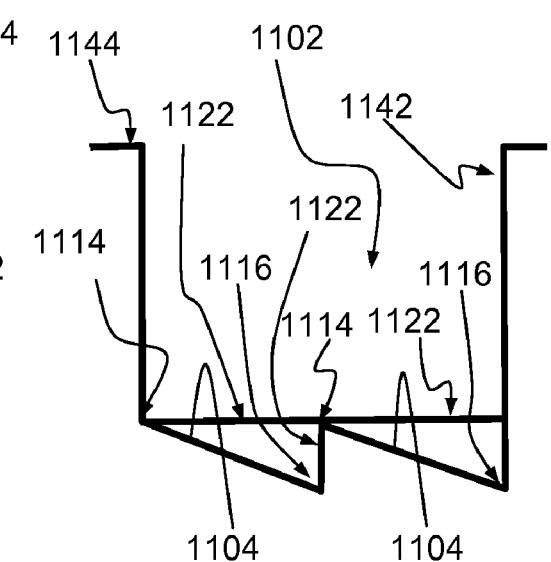
FIG. 11C is a cross-sectional view of the faceted lens rear surface of FIG. 11A taken along line C11-C11.

FIGS. 11A, 11B and 11C show an azimuthal lens rear surface 1102 according to one embodiment of the present invention that includes four facets 1104. Lens rear surface 1102 may be used in place of lens rear surface 734 of FIG. 7. Each facet 1104 is angled in an azimuthal direction with downward slope direction indicated by arrows 1112. Each facet 1104 has a high edge 1114 and a low edge 1116. There are also four walls 1122 where a high edge 1114 of one facet 1104 meets a low edge 1116 of an adjacent facet 1104. Lens rear surface 1102 somewhat resembles the end of a 4-sided end mill used in machine shops. Lens rear surface 1102 may also be viewed as an "escherian staircase." If one were to "walk" around lens rear surface 1102 in a counterclockwise direction, one would alternate walking downward on facets 1104 and stepping up walls 1122. Central region 1132 in the center of lens rear surface 1102 represents a region that may have a slightly different profile due to possible imperfections in the molding or machining process in producing lens rear surface 1102, possibly due to difficulty in machining and/or molding. Alternatively, central region 1132 may have a deliberately different, simpler profile, such as a flat, angled, curved, or lens profile, or a combination thereof. Lens rear surface 1102 is at the proximal end of a cylindrical recess 1142 that extends into an interior end surface 1144 of a cylindrical recess (not shown) that is similar to the cylindrical recess shown in FIG. 7.

In an alternative embodiment of the present invention, central region 1132 may have a deliberately different, simpler profile, such as a flat, angled, curved, or lens profile, or a combination thereof.

The refraction of the emitted light beam produces a "swirl" in the beam propagation. Thus the emitted light beam incident on the fiber has characteristics of the offset tilted launch illustrated in FIGS. 4-6. The "swirl" effect has some similarities to that produced by a "vortex lens" described in U.S. Pat. Nos. 6,496,621, 6,530,697 and 6,600,845, the entire contents and disclosure of which is hereby incorporated by reference. However, the swirl effect is a refractive effect rather than a diffractive effect produced by the vortex lens. Additionally, the complex surface of FIG. 11 comprises only 4 large surfaces (rather than many thousands of small surfaces of a vortex lens) and, therefore, is amenable to molding.

Figure 12B:
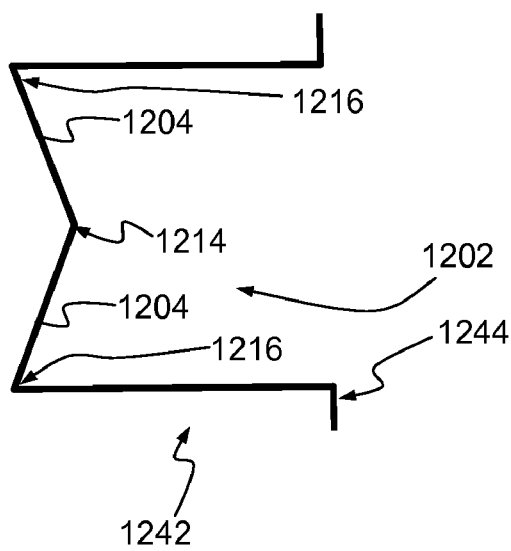
FIG. 12B is a cross-sectional view of the faceted lens rear surface of FIG. 11A taken along line B12-B12.
Figure 12C:
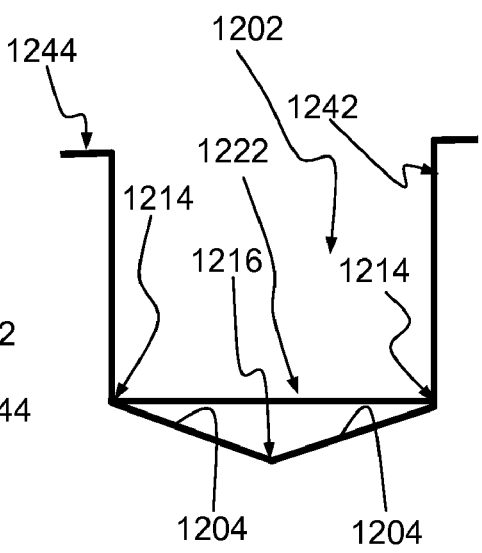
FIG. 12C is a cross-sectional view of the faceted lens rear surface of FIG. 11A taken along line C12-C12.

FIGS. 12A, 12B and 12C show an azimuthal lens rear surface 1202 according to one embodiment of the present invention that includes four facets 1204. Lens rear surface 1202 may be used in place of lens rear surface 734 of FIG. 7. Each facet 1204 is angled in an azimuthal direction with a downward slope direction indicated by arrows 1212 so that adjacent facets 1204 slant in opposite azimuthal directions. Each facet 1204 has a high edge 1214 and a low edge 1216. There are two ridges 1222 where a high edge 1214 of one facet 1204 meets a high edge 1214 of an adjacent facet 1204. There are two valleys 1224 where a low edge 1216 of one facet 1204 meets a low edge 1216 of an adjacent facet 1204. Central region 1232 in the center of lens rear surface 1202 represents a region that may not have a slightly different profile due to possible imperfections in the molding or machining process in producing lens rear surface 1102, possibly due to difficulty in machining and/or molding. Alternatively, central region 1232 may have a deliberately different, simpler profile, such as a flat, angled, curved, or lens profile, or a combination thereof. Lens rear surface 1202 is at the proximal end of a cylindrical recess 1242 that extends into an interior end surface 1244 of a cylindrical recess (not shown) that is similar to the cylindrical recess shown in FIG. 7.

An example of a modal pattern emitted by a multi-mode VCSEL (not shown) is superimposed and indicated by the shaded circles 1262. For such a modal pattern, it may be advantageous to orient the VCSEL with respect to facets 1204 such that the emitted light beam has minimal overlap with ridges 1222 and valleys 1224, of facets 1204. The same approach may be applied for surface 1102 of FIG. 11A to minimize overlap of the emitted light beam with walls 1122. Central region 1232 may be chosen to have a size approximately matched to the central, lowest-order mode 1264. Surface 1202 produces two "swirls" in opposite directions.

The lens surface of FIG. 12A has facets similar to the lens surface of FIG. 11A, but the directions of two of the angles are reversed. This results in elimination of the step-discontinuities of walls 1122 on the surface 1102 of FIG. 11A and therefore, makes the lens surface of FIG. 12A, even more amenable to fabrication in a molding process.

Figure 13B:
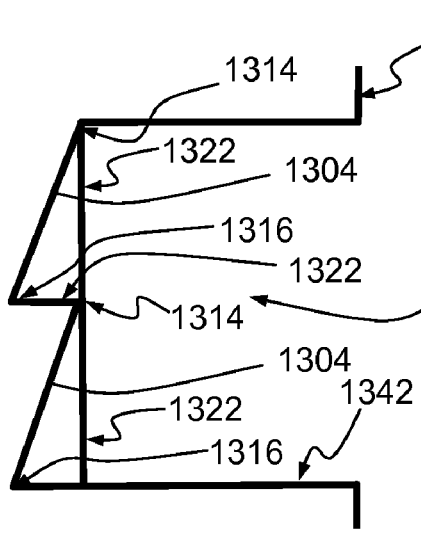
FIG. 13B is a cross-sectional view of the faceted lens rear surface of FIG. 11A taken along line B13-B13.
Figure 13C:
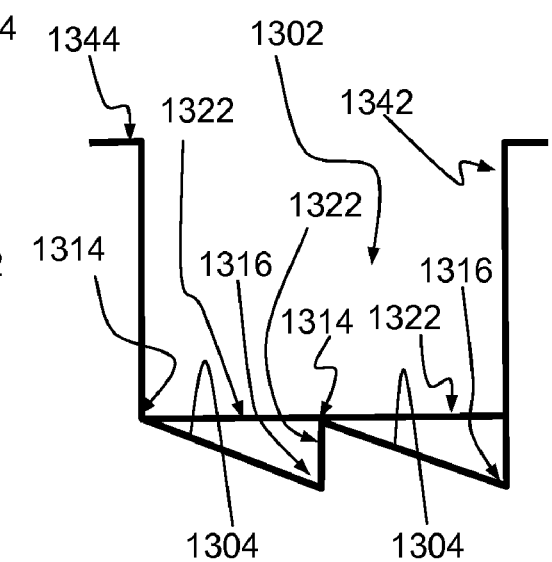
FIG. 13C is a cross-sectional view of the faceted lens rear surface of FIG. 11A taken along line C13-C13.

FIGS. 13A, 13B and 13C show an azimuthal lens rear surface 1302 according to one embodiment of the present invention that includes eight facets 1304. Lens rear surface 1302 may be used in place of lens rear surface 734 of FIG. 7. Each facet 1304 is angled in an azimuthal direction with downward slope direction indicated by arrows 1312. Each facet 1304 has a high edge 1314 and a low edge 1316. There are also eight walls 1322 where a high edge 1314 of one facet 1304 meets a low edge 1316 of an adjacent facet 1304. Central region 1332 in the center of lens rear surface 1302 represents a region that may not have a slightly different profile due to possible imperfections in the molding or machining process in producing lens rear surface 1302, possibly due to difficulty in machining and/or molding. Alternatively, central region 1332 may have a deliberately different, simpler profile, such as a flat, angled, curved, or lens profile, or a combination thereof. Lens rear surface 1302 is at the proximal end of a cylindrical recess 1342 that extends into an interior end surface 1344 of a cylindrical recess (not shown) that is similar to the cylindrical recess shown in FIG. 7.

Figure 14B:
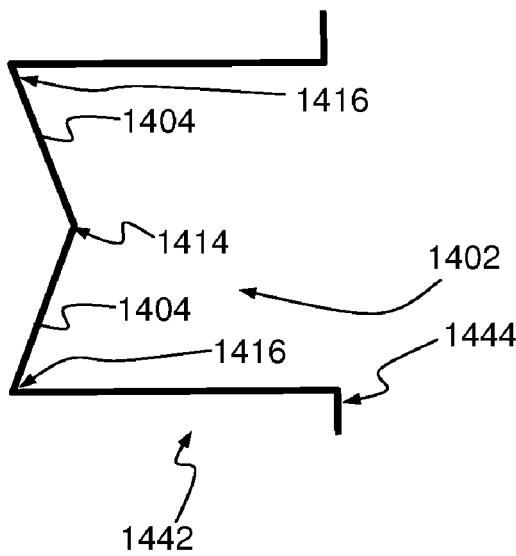
FIG. 14B is a cross-sectional view of the faceted lens rear surface of FIG. 14A taken along line B14-B14.
Figure 14C:
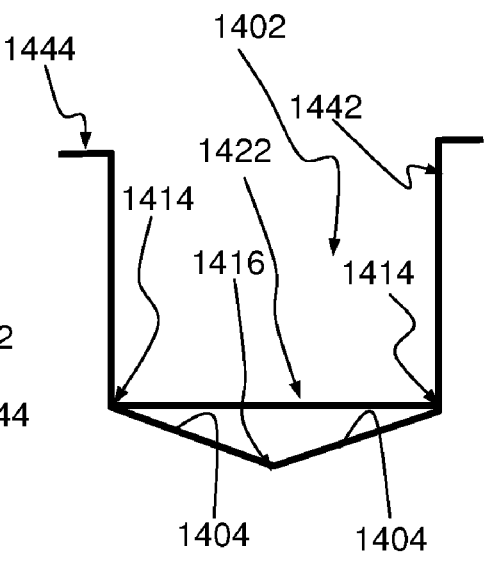
FIG. 14C is a cross-sectional view of the faceted lens rear surface of FIG. 14A taken along line C14-C14.

FIGS. 14A, 14B and 14C show an azimuthal lens rear surface 1402 according to one embodiment of the present invention that includes eight facets 1404. Lens rear surface 1402 may be used in place of lens rear surface 734 of FIG. 7. Each facet 1404 is angled in an azimuthal direction with a downward slope direction indicated by arrows 1412 so that adjacent facets 1404 slant in opposite azimuthal directions. Each facet 1404 has a high edge 1414 and a low edge 1416. There are four ridges 1422 where a high edge 1414 of one facet 1404 meets a high edge 1414 of an adjacent facet 1404. There are four valleys 1424 where a low edge 1416 of one facet 1404 meets a low edge 1416 of an adjacent facet 1404. Dashed circle 1432 in the center of lens rear surface 1402 represents a region that may not have a slightly different profile due to possible imperfections in the molding or machining process in producing lens rear surface 1402, possibly due to difficulty in machining and/or molding. Alternatively, central region 1432 may have a deliberately different, simpler profile, such as a flat, angled, curved, or lens profile, or a combination thereof. Lens rear surface 1402 is at the proximal end of a cylindrical recess 1442 that extends into an interior end surface 1444 of a cylindrical recess (not shown) that is similar to the cylindrical recess shown in FIG. 7.

Although FIGS. 12A and 14A show a lens rear surface with 4 facets and 8 facets, respectfully, where adjacent facets slant in opposite azimuthal directions, a lens rear surface of the present invention may include any even number of facets where adjacent facets slant in opposite azimuthal directions.

Figure 15B:
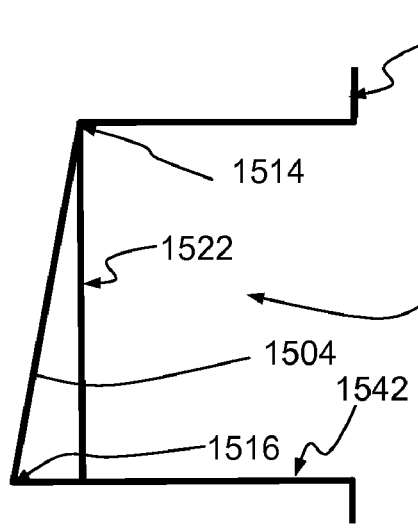
FIG. 15B is a cross-sectional view of the faceted lens rear surface of FIG. 15A taken along line B15-B15.
Figure 15C:
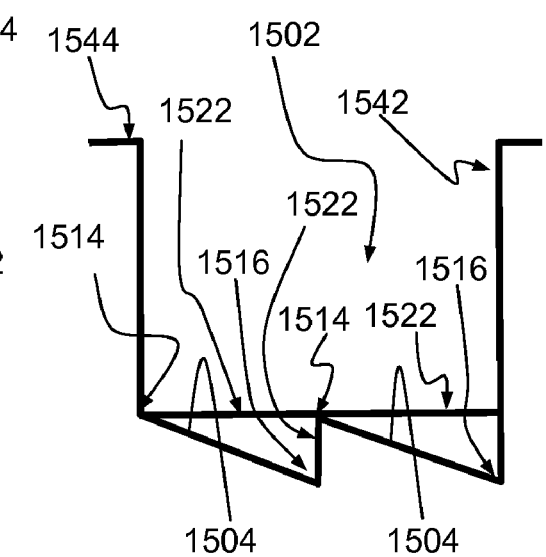
FIG. 15C is a cross-sectional view of the faceted lens rear surface of FIG. 15A taken along line C15-C15.

FIGS. 15A, 15B and 15C show an azimuthal lens rear surface 1502 according to one embodiment of the present invention that includes two facets 1504. Lens rear surface 1502 may be used in place of lens rear surface 734 of FIG. 7. Each facet 1504 is angled in an azimuthal direction with downward slope direction indicated by arrows 1512. Each facet 1504 has a high edge 1514 and a low edge 1516. There is also one wall 1522 where a high edge 1514 of each facet 1504 meets a low edge 1516 of the other facet 1504. Lens rear surface 1502 is at the proximal end of a cylindrical recess 1542 that extends into an interior end surface 1544 of a cylindrical recess (not shown) that is similar to the cylindrical recess shown in FIG. 7.

Figure 16A:
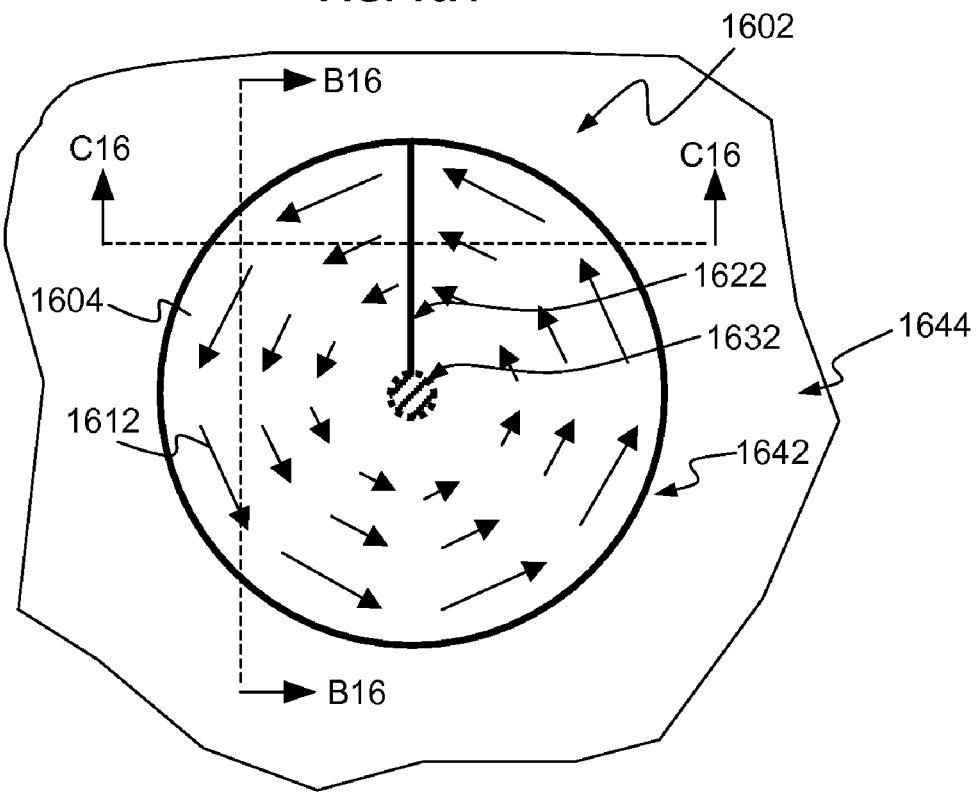
FIG. 16A is a schematic top view of an azimuthal faceted lens rear surface of the present invention comprising a single facet, a continuous radial sloped surface, slanted in an azimuthal direction.
Figure 16B:
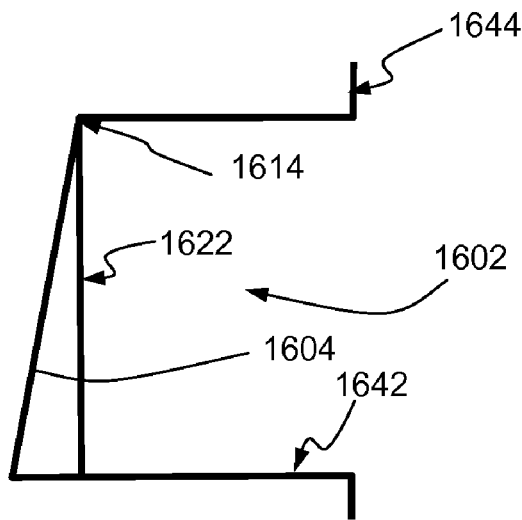
FIG. 16B is a cross-sectional view of the faceted lens rear surface of FIG. 16A taken along line B16-B16.
Figure 16C:
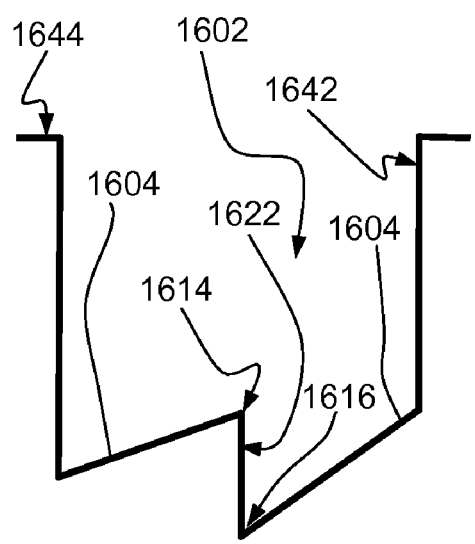
FIG. 16C is a cross-sectional view of the faceted lens rear surface of FIG. 16A taken along line C16-C16.

FIGS. 16A, 16B and 16C show an azimuthal lens rear surface 1602, continuous radial sloped surface, according to one embodiment of the present invention that includes a single facet 1604. Lens rear surface 1602 may be used in place of lens rear surface 734 of FIG. 7. Facet 1604 is angled in an azimuthal direction with downward slope direction indicated by arrows 1612. Facet 1604 has a high edge 1614 and a low edge 1616. There is a wall 1622 where high edge 1614 meets a low edge 1616. Central region 1632 in the center of lens rear surface 1602 represents a region that may not have a slightly different profile due to possible imperfections in the molding or machining process in producing lens rear surface 1602, possibly due to difficulty in machining and/or molding. Alternatively, central region 1632 may have a deliberately different, simpler profile, such as a flat, angled, curved, or lens profile, or a combination thereof. Lens rear surface 1602 is at the proximal end of a cylindrical recess 1642 that extends into an interior end surface 1644 of a cylindrical recess (not shown) that is similar to the cylindrical recess shown in FIG. 7.

Although a faceted lens rear surface is shown replacing a flat rear lens surface in FIGS. 11A, 12A, 13A, 14A, 15A and 16A, a faceted rear lens surface may also be angled such as the rear lens surface shown in FIG. and 10A.

Although FIGS. 11A, 13A, 15A and 16A show a lens rear surface with 4 facets, 8 facets, 2 facets and 1 facet respectfully, in the same azimuthal direction, a lens rear surface of the present invention may include any number of facets in the same azimuthal direction.

In one embodiment of the present invention, a faceted lens rear surface scatter at least 3% of the light passing through the lens rear surface, thereby reducing optical feedback in the optical subassembly including the faceted lens rear surface.

All documents, patents, journal articles and other materials cited in the present application are hereby incorporated by reference.

Although the present invention has been fully described in conjunction with several embodiments thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. An optical subassembly device comprising:
    a fiber receptacle for receiving an optical fiber, located on a distal end of the optical subassembly, wherein the fiber receptacle has a fiber axis, and wherein the fiber receptacle has a recess extending into an interior end surface of the fiber receptacle; and
    a lens having an optical axis, located on a proximal end of the optical sub-assembly, for focusing a light beam traveling through the optical subassembly;
    wherein the lens has a rear surface at a proximal end of the recess;
    wherein the lens rear surface includes a plurality of facets that are angled with respect to the fiber axis of the fiber receptacle, and wherein the lens rear surface is a radial accordion surface.

2. The optical subassembly device of claim 1, wherein the optical axis is displaced from the fiber axis.

3. The optical subassembly device of claim 1, further comprising a VCSEL for emitting the light beam, wherein the VCSEL has a VCSEL aperture displaced from the fiber axis.

4. The optical subassembly device of claim 1, wherein one or more of the plurality of facets has a curved surface.

5. The optical subassembly device of claim 1, wherein the lens rear surface scatters at least 3% of transmitted light passing through the lens rear surface.

6. An optical subassembly device comprising:
    a fiber receptacle for receiving an optical fiber, located on a distal end of the optical subassembly, wherein the fiber receptacle has a fiber axis, and wherein the fiber receptacle has a recess extending into an interior end surface of the fiber receptacle; and
    a lens having an optical axis, located on a proximal end of the optical sub-assembly, for focusing a light beam traveling through the optical subassembly;
    wherein the lens has a radial accordion rear surface at a proximal end of the recess; and
    wherein the radial accordion rear surface includes a flat, a concave, or a convex surface that is angled with respect to the fiber axis of the optical subassembly.

* * * * *